(12) United States Patent
Wahls et al.

(10) Patent No.: US 9,167,898 B2
(45) Date of Patent: Oct. 27, 2015

(54) RECLINER MECHANISM HAVING A BRAKE

(71) Applicant: Lear Corporation, Southfield, MI (US)

(72) Inventors: Robert Wahls, Commerce Township, MI (US); Jonathan David Conger, Berkley, MI (US); James S. Wawrzyniak, Warren, MI (US); Kenneth McQueen, Leonard, MI (US); Martin Stilleke, Recklinghausen (DE)

(73) Assignee: Lear Corporation, Southfield, MI (US)

( * ) Notice: Subject to any disclaimer, the term of this patent is extended or adjusted under 35 U.S.C. 154(b) by 210 days.

(21) Appl. No.: 13/965,372

(22) Filed: Aug. 13, 2013

(65) Prior Publication Data
US 2014/0097659 A1 Apr. 10, 2014

Related U.S. Application Data

(60) Provisional application No. 61/709,359, filed on Oct. 4, 2012.

(51) Int. Cl.
B60N 2/20 (2006.01)
A47C 1/025 (2006.01)
B60N 2/60 (2006.01)
B60N 2/225 (2006.01)

(52) U.S. Cl.
CPC .............. A47C 1/025 (2013.01); B60N 2/2252 (2013.01); B60N 2/2254 (2013.01); B60N 2/6009 (2013.01)

(58) Field of Classification Search
CPC .. B60N 2/2254; B60N 2/2252; B60N 2/6009; A47C 1/025

USPC .............................................. 297/362; 16/250
See application file for complete search history.

(56) References Cited

U.S. PATENT DOCUMENTS

| 5,277,672 | A | 1/1994 | Droulon et al. |
| 5,871,414 | A | 2/1999 | Voss et al. |
| 6,619,743 | B1 | 9/2003 | Scholz et al. |
| 6,755,470 | B2 | 6/2004 | Iwata et al. |
| 7,285,067 | B2 | 10/2007 | Krambeck et al. |
| 7,314,250 | B1 | 1/2008 | Eblenkamp et al. |
| 7,380,882 | B2 * | 6/2008 | Oki ........................... 297/367 R |
| 7,384,101 | B2 * | 6/2008 | Kawashima et al. ......... 297/362 |
| 7,455,361 | B2 * | 11/2008 | Stemmer et al. ............. 297/362 |
| 7,726,743 | B2 | 6/2010 | Smith et al. |
| 7,878,593 | B2 * | 2/2011 | Nae .............................. 297/362 |
| 8,240,768 | B2 | 8/2012 | Kienke et al. |
| 8,262,165 | B2 * | 9/2012 | Mitsuhashi ................... 297/362 |
| 8,282,167 | B2 * | 10/2012 | Kirubaharan et al. ........ 297/362 |
| 2008/0061616 | A1 * | 3/2008 | Wahls et al. .................. 297/362 |
| 2010/0013286 | A1 | 1/2010 | Haida et al. |
| 2011/0277574 | A1 * | 11/2011 | Mitsuhashi et al. ......... 74/411.5 |
| 2012/0001471 | A1 | 1/2012 | Wei |
| 2012/0007402 | A1 | 1/2012 | Stilleke et al. |
| 2012/0019041 | A1 | 1/2012 | Leconte et al. |
| 2012/0025586 | A1 | 2/2012 | Legras et al. |
| 2012/0086254 | A1 | 4/2012 | Schuler et al. |

FOREIGN PATENT DOCUMENTS

| DE | 102007010078 A1 * | 9/2008 |
| DE | 102009038735 A1 | 3/2011 |
| DE | 102009052512 A1 | 5/2011 |

* cited by examiner

Primary Examiner — Milton Nelson, Jr.
(74) Attorney, Agent, or Firm — Brooks Kushman P.C.

(57) ABSTRACT

A recliner mechanism having a first plate, a dust cover, and a brake. The brake may be configured to engage a set of dust cover teeth to inhibit rotation of the second plate with respect to the first plate.

20 Claims, 9 Drawing Sheets

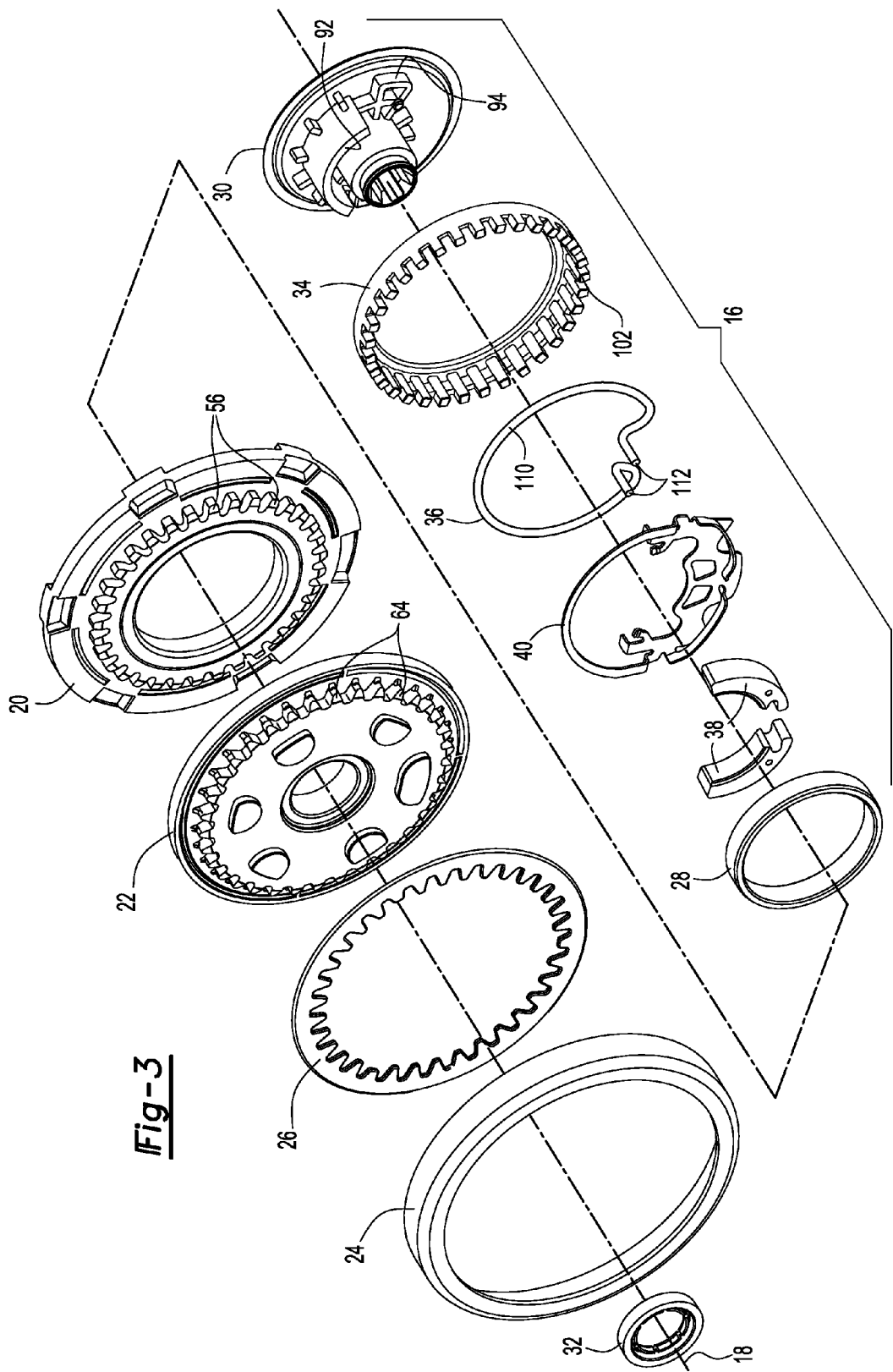

RECLINER MECHANISM HAVING A BRAKE

CROSS-REFERENCE TO RELATED APPLICATIONS

This application claims the benefit of U.S. provisional application Ser. No. 61/709,359 filed Oct. 4, 2012, the disclosure of which is hereby incorporated in its entirety by reference herein.

TECHNICAL FIELD

This application relates to a recliner mechanism having a brake.

BACKGROUND

A recliner mechanism having an anti back drive device is disclosed in U.S. Pat. No. 7,878,593.

SUMMARY

In at least one embodiment, a recliner mechanism is provided. The recliner mechanism may have a first plate, a second plate, a dust cover, and a brake. The second plate may be configured to rotate with respect to the first plate. The dust cover may have a set of dust cover teeth that couple the dust cover to the first plate. The brake may be configured to engage the set of dust cover teeth to inhibit rotation of the second plate with respect to the first plate.

In at least one embodiment, a recliner mechanism is provided. The recliner mechanism may have a first plate, a second plate, a dust cover, a driver, and a brake. The first plate may have a first set of teeth. The second plate may be configured to rotate with respect to the first plate. The dust cover may have a set of dust cover teeth that may engage the first set of teeth. The driver may extend through the dust cover and may secure the dust cover to the first plate. The brake may be disposed between the dust cover and the first plate. The brake may be configured to engage the set of dust cover teeth to inhibit rotation of the second plate with respect to the first plate.

BRIEF DESCRIPTION OF THE DRAWINGS

FIG. 3 is a reverse exploded view of the recliner mechanism.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
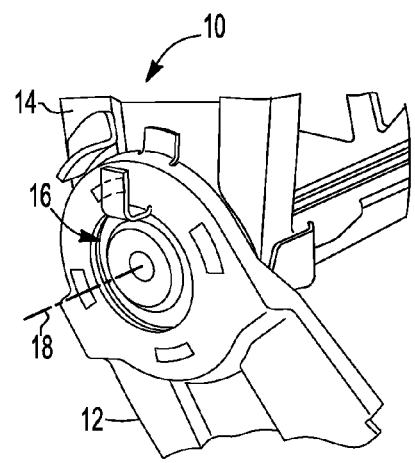
FIG. 1 is a perspective view of a portion of a seat assembly having a recliner mechanism.

Referring to FIG. 1, a portion of a seat assembly 10 is shown. The seat assembly 10 may have a seat bottom 12, a seat back 14, and a recliner mechanism 16.

Figure 2:
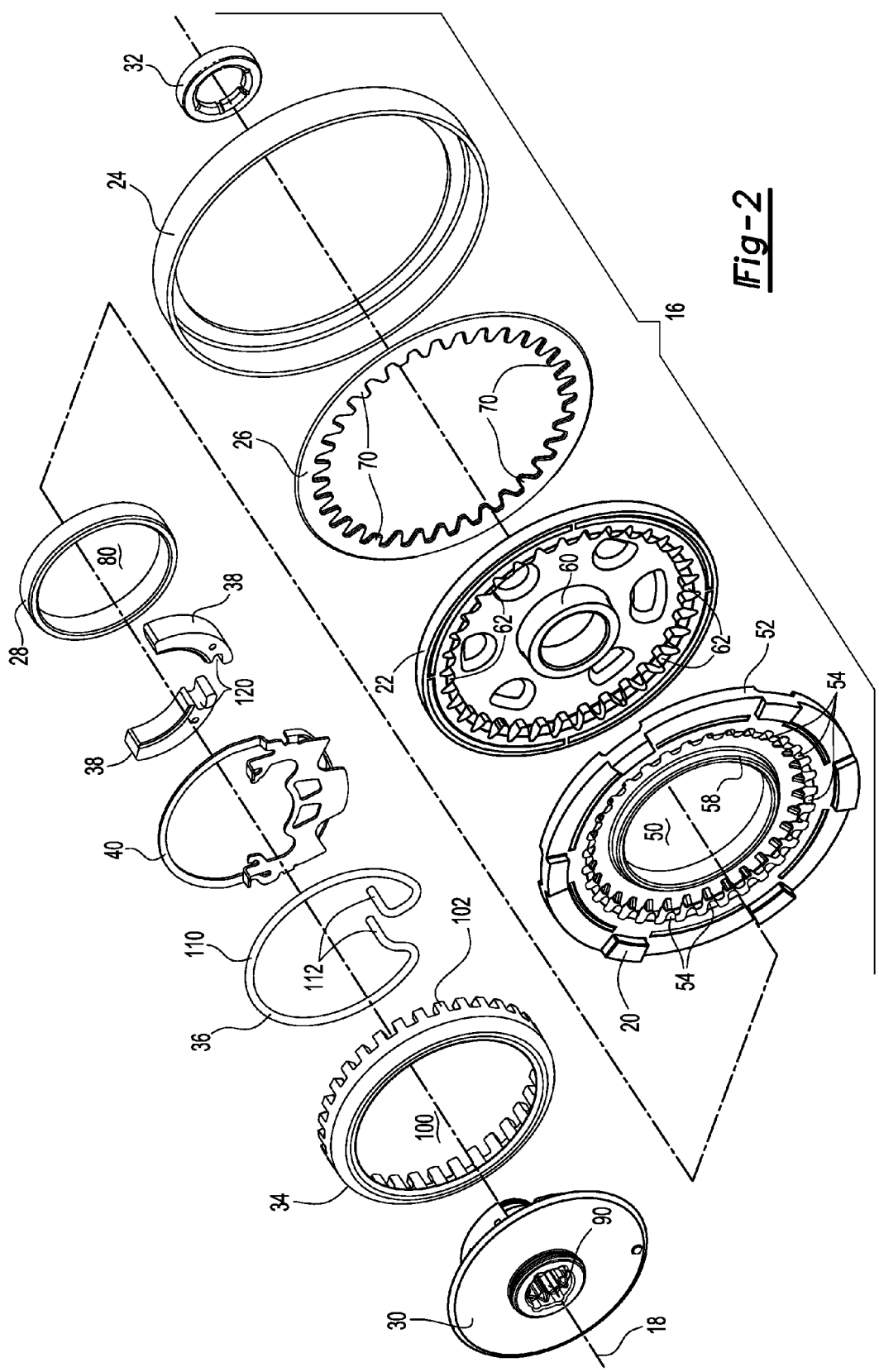
FIG. 2 is an exploded view of the recliner mechanism.

Referring to FIGS. 2 and 3, exploded views of the recliner mechanism 16 are shown. The recliner mechanism 16 may be configured to control pivoting of the seat back 14 about an axis 18 with respect to the seat bottom 12. For example, the recliner mechanism 16 may facilitate pivoting of the seat back 14 between a folded position in which the seat back 14 may be generally positioned over the seat bottom 12 through intermediate positions and to a reclined position. One or more recliner mechanisms 16 may be provided with the seat assembly 10. For example, a pair of recliner mechanisms 16 may be disposed along opposing lateral sides of the seat back 14 to selectively permit or inhibit pivoting of the seat back 14.

The recliner mechanism 16 may include a first plate 20, a second plate 22, a retainer ring 24, a glide 26, a bearing 28, a driver 30, a clip 32, a dust cover 34, a spring 36, a pair of wedges 38, and a brake 40.

The first plate 20, which may also be called a fixed plate, may be fixedly positioned on or with respect to a seat bottom 12. For example, the first plate 20 may be configured to be coupled to the seat bottom 12 via a recliner mounting bracket that may be fixedly disposed on a seat bottom frame. In at least one embodiment, the first plate 20 may be generally configured as a circular disc and may include a center hole 50, an outer surface 52, a first set of teeth 54, and a second set of teeth 56.

The center hole 50 may receive the bearing 28, the driver 30, and the wedges 38. In at least one embodiment, the center hole 50 may be disposed at the center of the first plate 20 and may be radially disposed about the axis 18. A raised rim 58 may be extend around the center hole 50.

The outer surface 52 may be disposed opposite the center hole 50 and may face toward and may engage the retainer ring 24. In at least one embodiment, the outer surface 52 or a portion thereof may be radially disposed with respect to the axis 18 and may at least partially define an outside circumference of the first plate 20.

The first set of teeth 54 may be disposed on a side of the first plate 20 that faces toward the driver 30. Members of the first set of teeth 54 may extend toward the axis 18 and may be configured to engage the dust cover 34.

The second set of teeth 56 may be disposed on an opposite side of the first plate 20 from the first set of teeth 54 as is best shown in FIG. 3. Members of the second set of teeth 56 may extend away from the axis 18.

The second plate 22 may be configured to be coupled to the seat back 14 and to rotate with respect to the first plate 20. For example, the second plate 22 may be coupled to a side member of the seat back frame or may be fixedly disposed on a recliner mounting bracket that may be coupled to the seat back frame. The second plate 22 may be disposed adjacent to the first plate 20. The second plate 22 may include a center hub 60, a set of internal teeth 62, and a set of external teeth 64.

The center hub 60 may extend into the center hole 50 of the first plate 20. The center hub 60 may define a hole through which the driver 30 may extend. In at least one embodiment, the center hub 60 may be disposed at the center of the second plate 22 and may be radially disposed around the axis 18.

The set of internal teeth 62 may be disposed on a side of the second plate 22 that faces toward the driver 30. The internal teeth 62 may extend toward the axis 18 and may be configured to engage the second set of teeth 56 on the first plate 20. More specifically, the internal teeth 62 and second set of teeth 56 have an eccentric gear relationship and may be continuously engaged.

The external teeth 64 may be disposed on an opposite side of the second plate 22 from the internal teeth 62 as is best shown in FIG. 3. The external teeth 64 may extend away from the axis 18.

The retainer ring 24 may couple the first plate 20 to the second plate 22. More specifically, the retainer ring 24 may be secured to the first plate 20 but not secured to or clamped onto the second plate 22. As such, the second plate 22 may be received between the retainer ring 24 and the first plate 20 such that axial movement of the second plate 22 is inhibited while rotational movement of the second plate 22 with respect to the retainer ring 24 and first plate 20 may be permitted.

The glide 26 may be located between the retainer ring 24 and the second plate 22. The glide 26 may act as a spacer that may separate the second plate 22 from the retainer ring 24. The glide 26 may be configured as a generally planar ring and may be made of a polymeric material like nylon. The glide 26 may have a set of glide teeth 70 that extend toward the axis 18 and mate with the external teeth 64 of the second plate 22 to help center and position the glide 26.

The bearing 28 may be disposed in the center hole 50 of the first plate 20. In addition, the bearing 28 may be fixedly attached to the first plate 20. The bearing 28 may be configured as a ring and may have a center hole 80 that may receive the wedges 38. In addition, the bearing 28 may have generally smooth surfaces that may not have teeth.

The driver 30 may extend through the bearing 28, the dust cover 34, the center hole 50 of the first plate 20, and the hole defined by the center hub 60 of the second plate 22. The driver 30 may also help secure the dust cover 34 to the recliner mechanism 16 and inhibit axial movement of the dust cover 34 away from the first plate 20. The driver 30 may be configured to rotate in either direction about the axis 18. Rotation of the driver 30 may actuate the brake 40 and may actuate the wedges 38 as will be discussed in more detail below. The driver 30 may include a shaft hole 90 that may receive an input shaft (not shown) that may rotate the driver 30 about the axis 18. The driver 30 may also include a wedge engagement feature 92 and two brake engagement features 94. The wedge engagement feature 92, which is best shown in FIG. 3, that may engage either wedge 38 or may be spaced apart from the wedges 38 as will be discussed in more detail below. The brake engagement features 94 may engage the brake 40 such that the brake 40 rotates with the driver 30.

The clip 32 may secure the driver 30 to the recliner mechanism 16. The clip 32 may configured as a ring that may be disposed in the center hub 60 of the second plate 22 and may receive an end of the driver 30. As such, the clip 32 may inhibit axial movement of the driver 30 while permitting the driver 30 to rotate about the axis 18. The clip 32 may be spaced apart from and may not engage the second plate 22 when installed on the driver 30.

Figure 5:
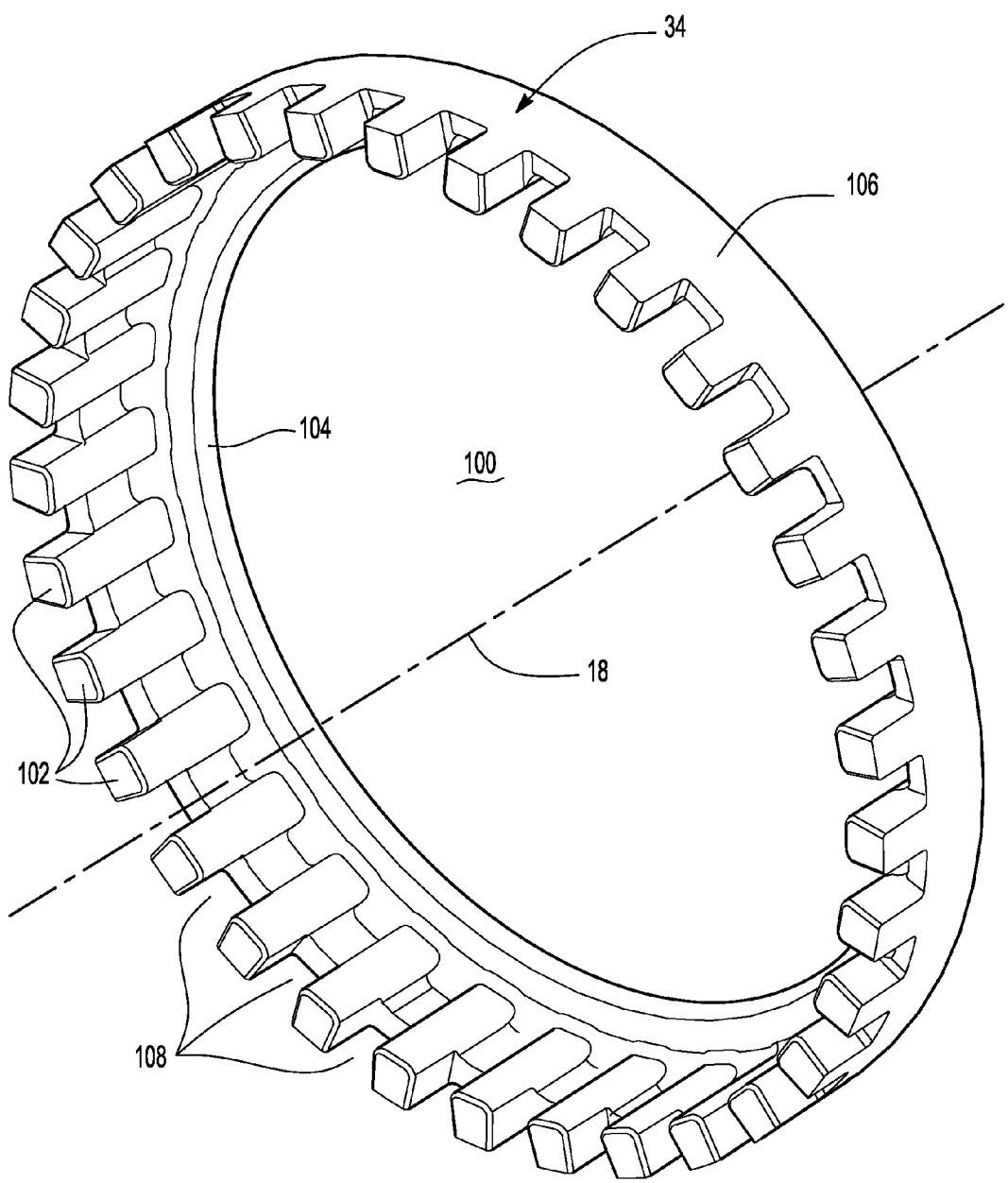
FIG. 5 is a perspective view of a dust cover that may be provided with the recliner mechanism.

The dust cover 34, which is also shown in FIG. 5, may extend between the first plate 20 and the driver 30. The dust cover 34 may have a generally ring-shaped configuration that may be radially disposed around the axis 18 and may include a hole 100 and a set of dust cover teeth 102. The driver 30 may extend through the hole 100. The dust cover teeth 102 may be arranged around the axis 18 and may be spaced apart from each other. The dust cover teeth 102 may extend both axially (i.e., parallel to the axis 18) and radially (i.e., toward the axis 18) as is best shown in FIG. 5. More specifically, the dust cover teeth 102 may extend away from an end surface 104 of the dust cover 34 and may extend inward or toward the axis 18 from an outside circumferential surface 106 of the dust cover 34. A gap 108 may be disposed between adjacent dust cover teeth 102. The dust cover teeth 102 may facilitate coupling or mounting of the dust cover 34 to the first plate 20. For instance, the dust cover teeth 102 may engage and may be received between members of the first set of teeth 54 of the first plate 20. As such, the dust cover 34 may be fixedly positioned with respect to the first plate 20 and may not rotate with the driver 30. In addition, the dust cover teeth 102 may be engaged by the brake 40 as will be discussed in more detail below.

The spring 36 may be disposed between the first plate 20 and the dust cover 34. The spring 36 may include a curved portion 110 and a pair of arms 112. The curved portion 110 may extend along an arc and may be radially disposed with respect to the axis 18. The arms 112 may be disposed at opposite ends of the curved portion 110 and may extend axially or generally parallel to the axis 18 and toward the first plate 20. Each arm 112 may extend through the brake 40 and may engage a corresponding wedge 38 as will be discussed in more detail below. The spring 36 may exert a biasing force on the wedges 38. More specifically, the spring 36 may bias the wedges 38 away from each other.

Figure 4:
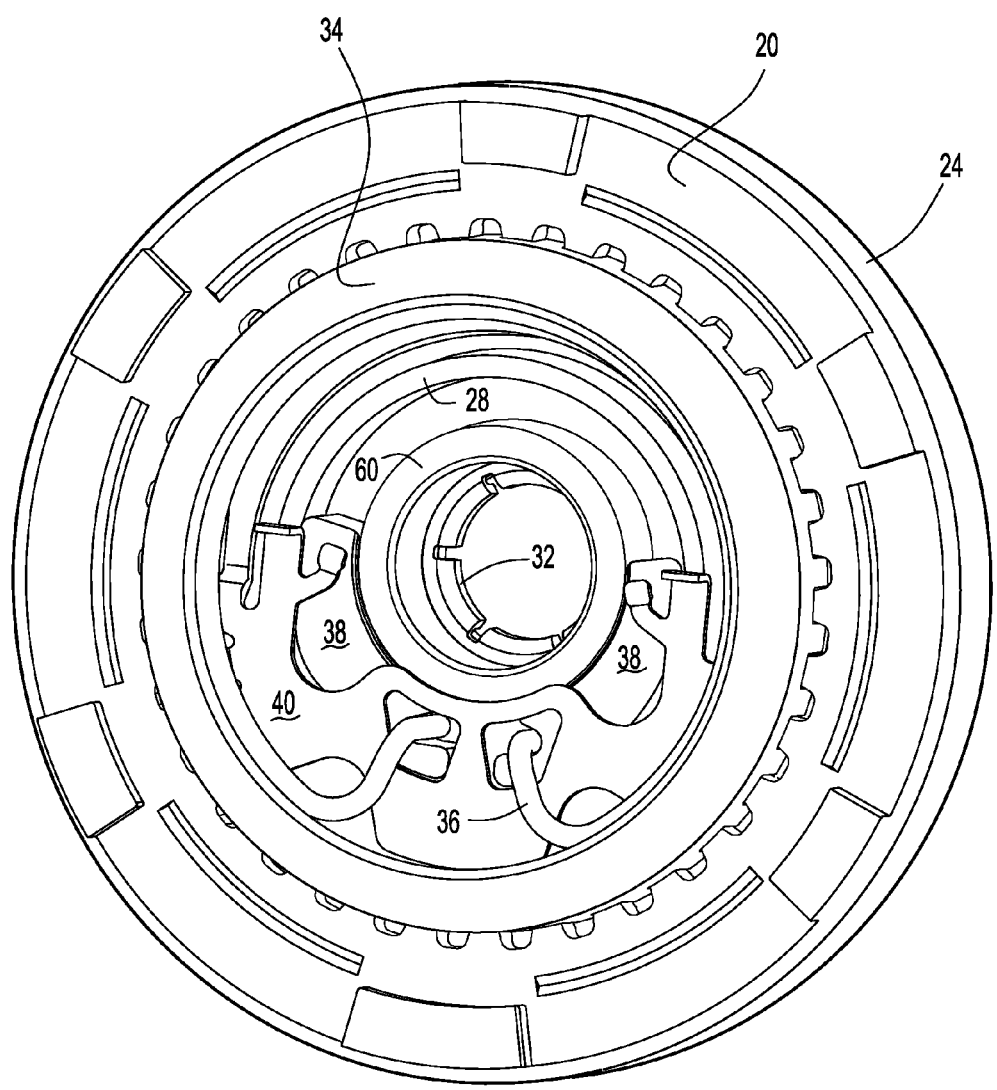
FIG. 4 is a perspective view of the recliner mechanism without a driver.
Figure 7:
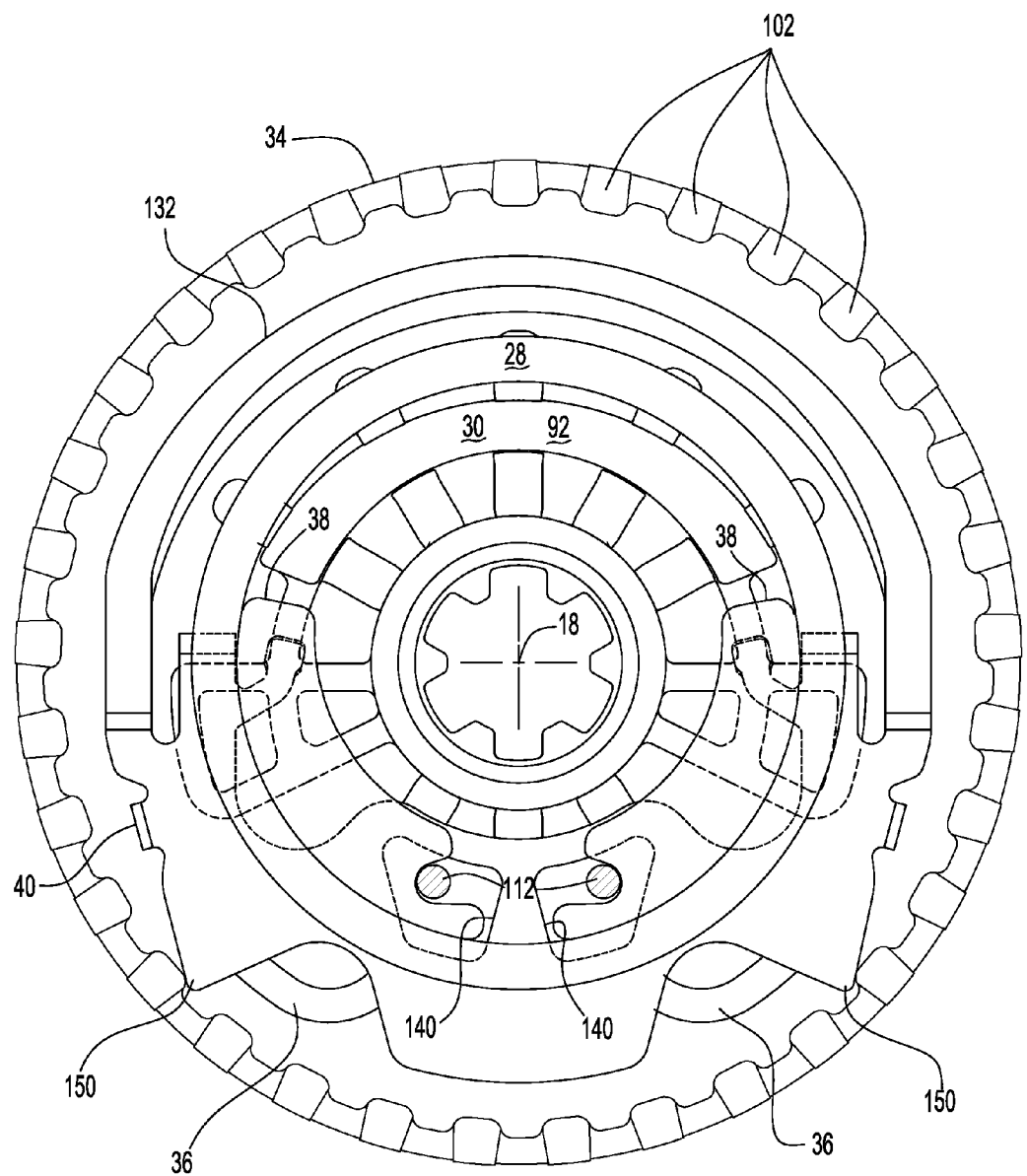
FIGS. 7-10 illustrate a recliner mechanism actuation sequence.

The wedges 38 may be disposed in the center hole 80 of the bearing 28 (and thus in the center hole 50 of the first plate 20) between the bearing 28 and the center hub 60 of the second plate 22. As is best shown in FIGS. 4 and 7, the wedges 38 may also be spaced apart from each other. Each wedge 38 may have a slot 120 that may receive a corresponding arm 112 of the spring 36. One wedge 38 may be engaged by the wedge engagement feature 92 on the driver 30 when the driver 30 is sufficiently rotated as will be discussed in more detail below. Moreover, the wedges 38 may be spaced apart from and may not engage the brake 40 at all rotational positions in one or more embodiments.

Figure 6:
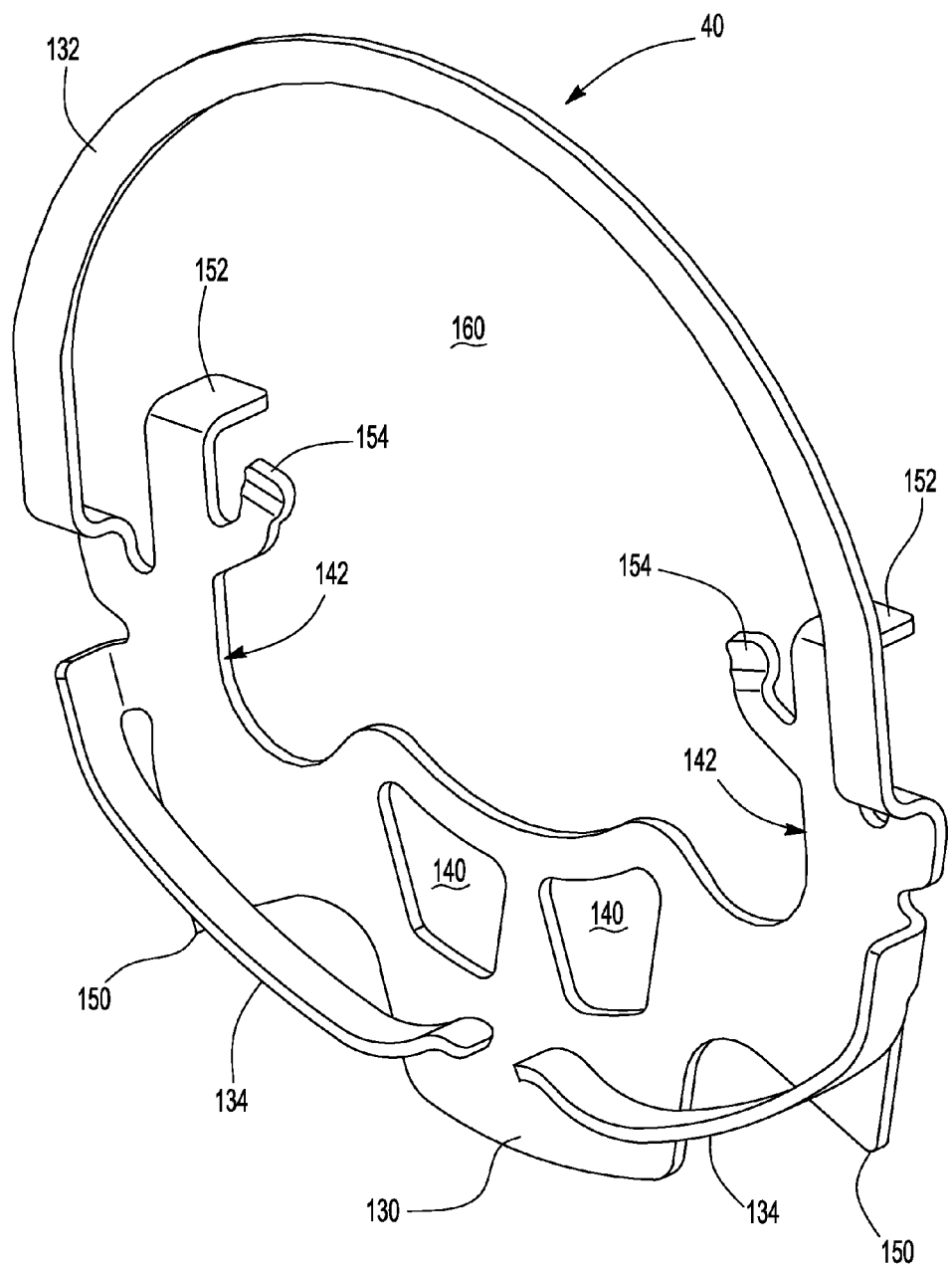
FIG. 6 is a perspective view of a brake that may be provided with the recliner mechanism.

The brake 40, which is also shown in FIG. 6, may be generally disposed between the first plate 20 and the driver 30 or between the first plate 20 and the dust cover 34. Moreover, the brake 40 may be spaced apart from the first plate 20. The brake 40 may inhibit changing or creeping of the seat back 14 to a position that differs from that at which it was initially set. As such, the brake 40 may help maintain a desired seat back position during dynamic operating conditions and avoid rotational creep of the recliner mechanism 16 and associated seat back position adjustment corrections. The brake 40 may be made from a thin sheet of metal and may include a panel 130, an arcuate band 132, and at least one spring arm 134.

The panel 130 may be offset from the arcuate band 132 and may generally be disposed between the driver 30 and the wedges 38. In at least one embodiment, the panel 130 may include at least one spring arm window 140 and at least one wing 142.

The spring arm window 140 may receive one or more arms 112 of the spring 36. In the embodiment shown, two spring arm windows 140 are provided. The edges of each spring arm window 140 may be configured to engage the corresponding arm 112 to actuate the spring 36 when the driver 30 and brake 40 are rotated about the axis 18 as will be discussed in more detail below.

A pair of wings 142 may be disposed opposite each other or at opposite ends of the panel 130. Each wing 142 may include a dust cover engagement feature 150, a driver engagement feature 152, and one or more inner arms 154.

The dust cover engagement feature 150 may be configured to engage the dust cover 34. For example, the dust cover engagement feature 150 may be configured to engage members of the set of dust cover teeth 102 to inhibit rotation of the second plate 22. In the embodiment shown, two dust cover engagement features 150 are provided that may be configured as pointed corners that are disposed near the dust cover teeth 102 as is best shown in FIG. 7. The dust cover engagement features 150 may be spaced apart from each other and may be spaced apart from the first plate 20. In addition, each dust cover engagement feature 150 may be disposed opposite a corresponding driver engagement feature 152 or at opposite ends of a wing 142. For instance, the dust cover engagement feature 150 may be disposed directly opposite the driver engagement feature 152 along a line or linear direction in which the wing 142 extends. The dust cover engagement features 150 may extend away from the axis 18 or point outward toward the outside circumference of the recliner mechanism 16. A dust cover engagement feature 150 may be received in a gap 108 between adjacent dust cover teeth 102 to brake or inhibit rotation of the second plate 22 and may not be disposed between two adjacent dust cover teeth 102 when braking is not provided as will be discussed in more detail below.

The driver engagement feature 152 may facilitate mounting of the brake 40 to the driver 30. In the embodiment shown, two driver engagement features 152 are provided. Each driver engagement feature 152 may extend toward the driver 30 and may engage a corresponding brake engagement feature 94 on the driver 30. As such, the brake 40 may rotate with the driver 30. In addition, the driver engagement features 152 may be spaced apart from the arcuate band 132.

An inner arm 154 may extend from the wing 142. In the embodiment shown, an inner arm 154 extends inwardly or generally away from the outside circumference of the recliner mechanism 16 and may be located between the dust cover engagement feature 150 and the driver engagement feature 152. The inner arms 154 may be disposed between the wedges 38 and the driver 30. More specifically, the inner arms 154 may engage the driver 30 and may be spaced apart from the wedges 38. The inner arms 154 may also engage a surface of the bearing 28 that faces toward the driver 30 but may not extend into the center hole 80 of the bearing 28. As such, no portion of the brake 40 may be disposed in the bearing 28.

The arcuate band 132 may extend along an arc or may be radially disposed with respect to the axis 18. The arcuate band 132 may be axially offset from the panel 130. In addition, the arcuate band 132 may define an outer surface or outside circumference of a portion of the brake 40 and may be disposed between the driver 30 and the dust cover 34. The panel 130 and arcuate band 132 may cooperate to define an opening 160. The driver 30 may extend through the opening 160.

The spring arms 134 may extend from the panel 130 and may be spaced apart from the arcuate band 132. The spring arms 134 may engage the raised rim 58 on the first plate 20 and may bias the dust cover engagement features 150 toward the dust cover teeth 102.

Operation of the recliner mechanism 16 and more specifically the brake 40 is best understood with reference to FIGS. 7-10. More specifically, FIGS. 7-10 show actuation of brake 40 from a braked or locked position in which rotation of the recliner mechanism 16 is inhibited to an unlocked position in which the recliner mechanism 16 can rotate. Movement from the locked position to the unlocked position may occur by rotating the driver 30 and brake 40 in either a clockwise direction or a counterclockwise direction due to the symmetry of the recliner mechanism components. In FIGS. 7-10, counterclockwise rotation is illustrated. In FIGS. 7-10, the first plate 20 and the second plate 22 are not shown for clarity.

Referring to FIG. 7, the recliner mechanism 16 is initially shown in the braked or locked position. The wedge engagement feature 92 of the driver 30 is spaced apart from the wedges 38. The spring 36 biases the wedges 38 away from each other and against the bearing 28. The brake 40 and its dust cover engagement features 150 may be separated from the first plate 20 by the dust cover 34 and the set of dust cover teeth 102. The brake 40 is positioned such that the dust cover engagement features 150 engage the dust cover 34 and are received between adjacent dust cover teeth 102. As such, the dust cover engagement features 150 engage members of the set of dust cover teeth 102 to inhibit rotation of the second plate 22 with respect to the first plate 20. Such positioning of the brake 40 may be maintained by the biasing force exerted by the spring arms 134, which are not shown in FIG. 7.

Figure 8:
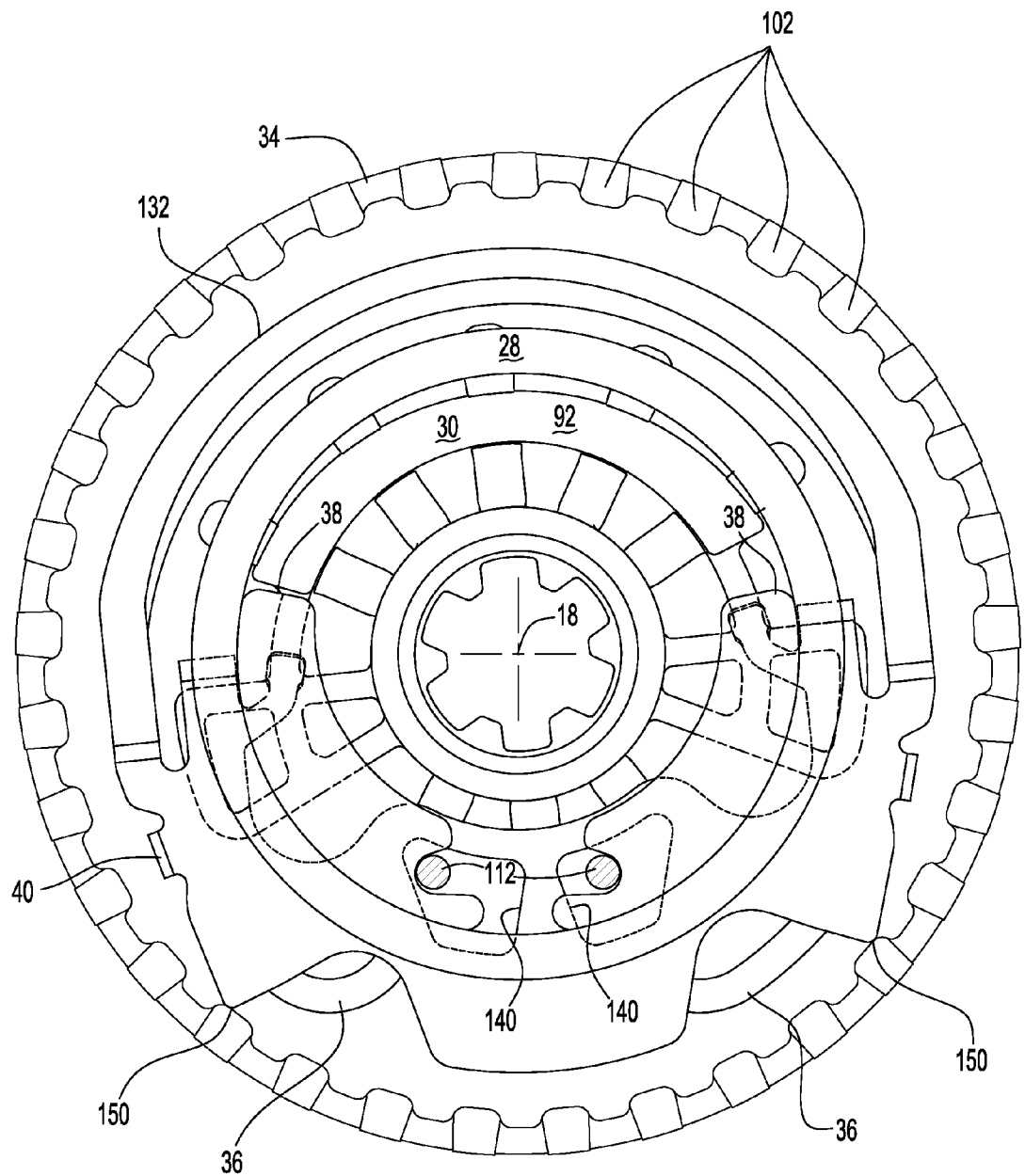

Referring to FIG. 8, the driver 30 is rotated counterclockwise about the axis 18 from the position shown in FIG. 7. The wedge engagement feature 92 of the driver 30 remains spaced apart from the wedges 38. Rotation of the driver 30 in the counterclockwise direction causes the brake 40 to rotate counterclockwise with the driver 30. This rotation of the brake 40 moves the dust cover engagement features 150 such that they are no longer locked between adjacent dust cover teeth 102. A dust cover engagement feature 150 may engage and move across the face of a dust cover tooth 102.

Figure 9:
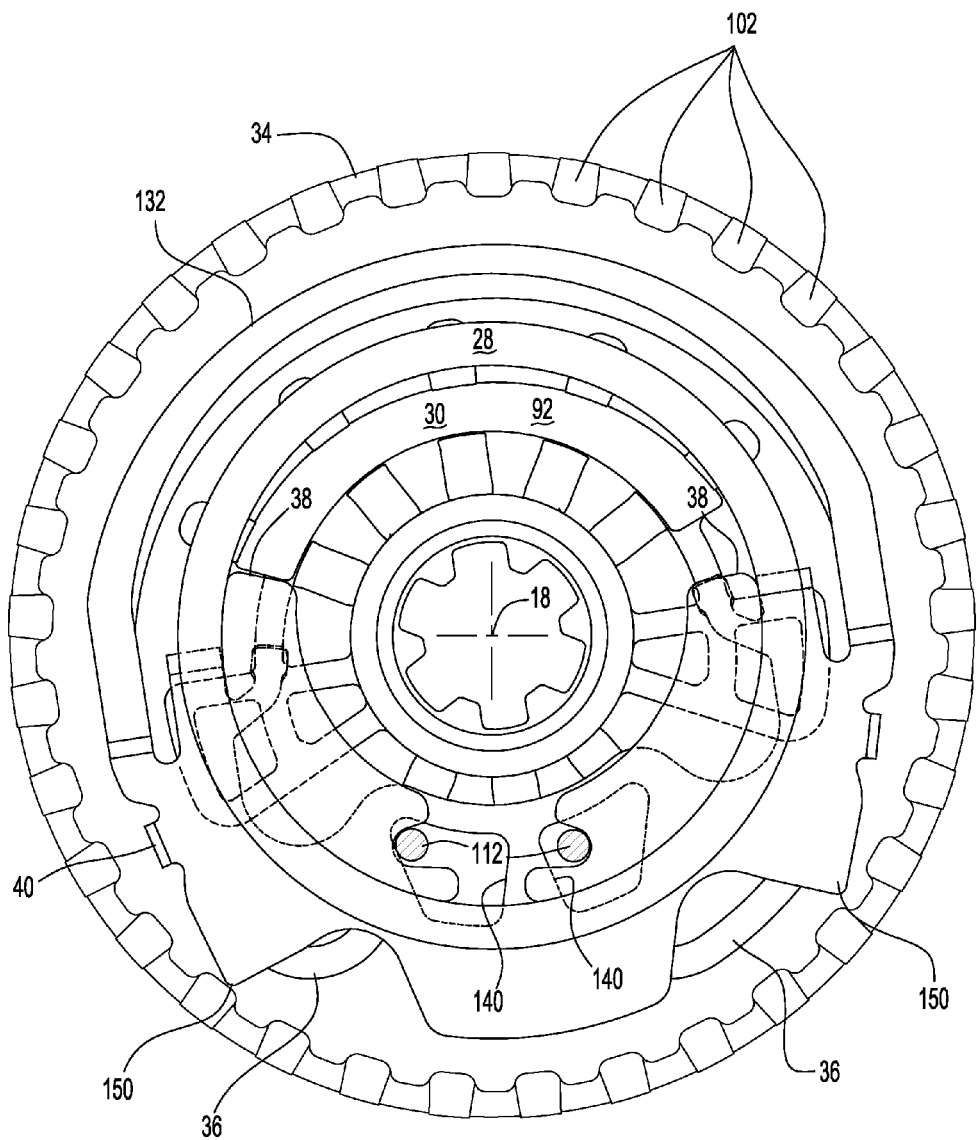

Referring to FIG. 9, the driver 30 and brake 40 are rotated further counterclockwise from the position shown in FIG. 8. The wedge engagement feature 92 remains spaced apart from the wedges 38. The dust cover engagement features 150 remain positioned such that they are not locked between adjacent dust cover teeth 102. An arm 112 of the spring 36 will now engage the edge of a corresponding window. In FIG. 9, the arm 112 that is located in the left spring arm window 140 now engages the edge of the left spring arm window 140. As such, an arm 112 may be spaced apart from the brake 40 when a dust cover engagement feature 150 is disengaged from the dust cover 34. Alternatively, the arm 112 that is located in the right spring arm window 140 may engage an edge of the right spring arm window 140 before the arm 112 that is located in the left spring arm window 140 engages the edge of the left spring arm window 140 depending on tolerances and/or the initial position of the wedges 38. Opposite sides or edges of at least one spring arm window 140 may be engaged if the driver 30 was rotated in a clockwise direction.

Figure 10:
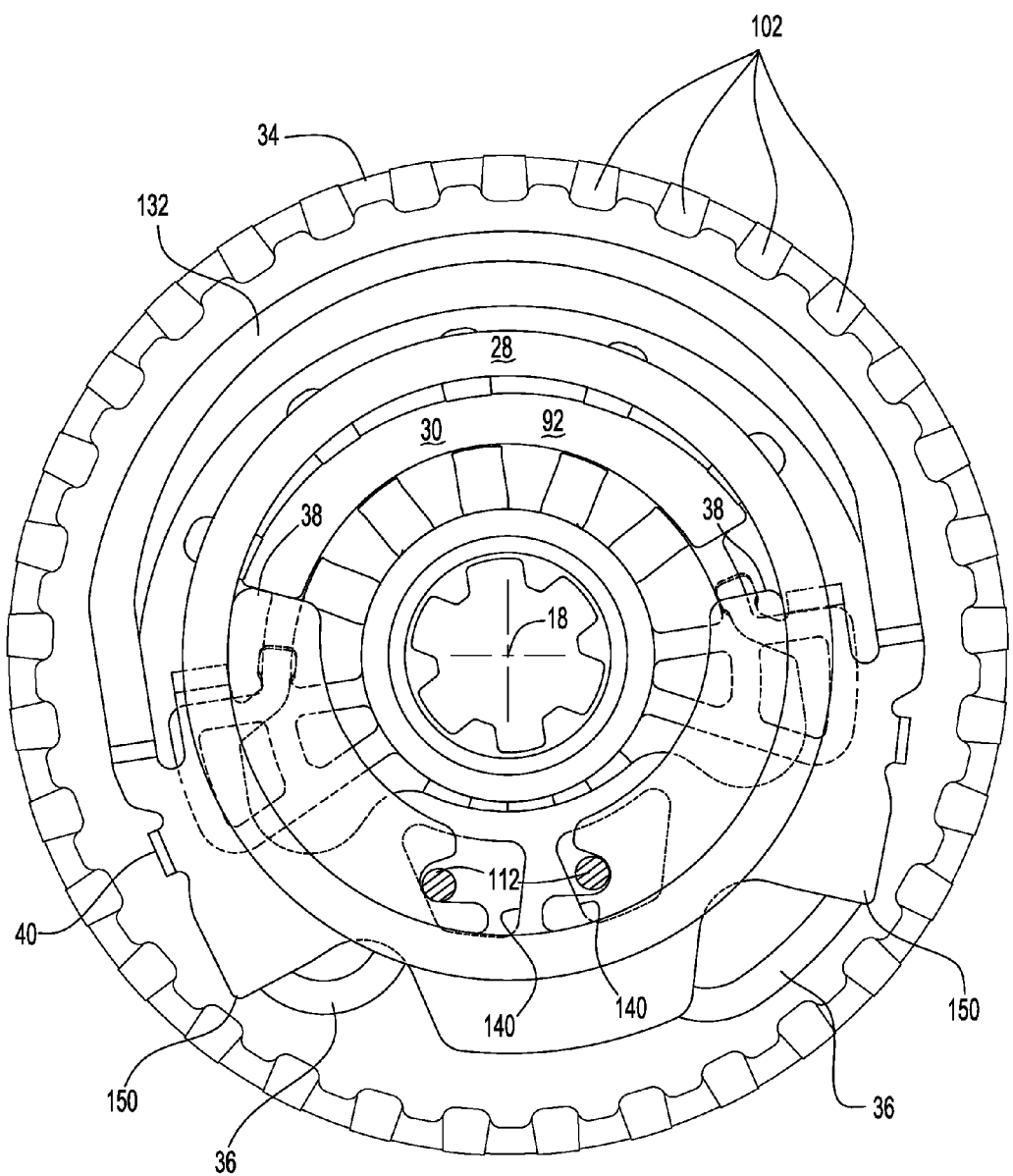

Referring to FIG. 10, the driver 30 and brake 40 are rotated further counterclockwise from the position shown in FIG. 9. The biasing force exerted by the spring 36 and arm 112 keep the arm 112 in the left spring arm window 140 engaged against the angled left side of the left spring arm window 140 and restricts rotation of the brake 40. As a result, the brake 40 moves slightly upward and the dust cover engagement features 150 move further away from the dust cover teeth 102. As such, the dust cover engagement features 150 disengage and are held away from the dust cover teeth 102 to prevent braking and thereby permit rotation of the second plate 22 with respect to the first plate 20. Very shortly or immediately after the brake 40 moves slightly upward, the wedge engagement feature 92 of the driver 30 may engage the left wedge 38. Further rotation allows the second plate 22 to begin to rotate with respect to the first plate 20 to allow the seat back 14 to pivot.

In one or more embodiments, the recliner mechanism configuration in which the brake 40 may engage teeth the dust cover 34 may provide a longer contact surface or greater engagement length as compared to a configuration in which the brake engages the first plate 20, thereby providing a more robust design.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recliner mechanism comprising:
   a first plate;
   a second plate that is configured to rotate with respect to the first plate;
   a dust cover having a set of dust cover teeth that couple the dust cover to the first plate; and
   a brake that is configured to engage the set of dust cover teeth to inhibit rotation of the second plate with respect to the first plate.

2. The recliner mechanism of claim 1 wherein the brake disengages the set of dust cover teeth to permit rotation of the second plate with respect to the first plate.

3. The recliner mechanism of claim 1 wherein the brake is spaced apart from the first plate.

4. The recliner mechanism of claim 1 wherein the first plate has a first set of teeth, wherein members of the set of dust cover teeth are received between members of the first set of teeth.

5. The recliner mechanism of claim 4 wherein the brake is not received between members of the first set of teeth.

6. The recliner mechanism of claim 1 wherein the brake has a dust cover engagement feature, wherein the set of dust cover teeth is disposed between and separates the dust cover engagement feature from the first plate.

7. The recliner mechanism of claim 1 wherein the dust cover has an outside circumferential surface and the set of dust cover teeth extend radially inward from the outside circumferential surface.

8. A recliner mechanism comprising:
   a first plate having a first set of teeth;
   a second plate that is configured to rotate with respect to the first plate;
   a dust cover having a set of dust cover teeth that engage the first set of teeth;
   a driver that extends through the dust cover and secures the dust cover to the first plate; and
   a brake that is disposed between the dust cover and the first plate, wherein the brake is configured to engage the set of dust cover teeth to inhibit rotation of the second plate with respect to the first plate.

9. The recliner mechanism of claim 8 wherein the dust cover extends from the driver to the first plate.

10. The recliner mechanism of claim 8 wherein the brake has a panel that includes a wing disposed at an end of the panel, wherein the wing includes a dust cover engagement feature that is configured to engage a member of the set of dust cover teeth to inhibit rotation of the second plate.

11. The recliner mechanism of claim 10 wherein the dust cover engagement feature does not engage the first plate.

12. The recliner mechanism of claim 10 wherein the brake further comprises a driver engagement feature that engages the driver, wherein the driver engagement feature and the dust cover engagement feature are disposed at opposite ends of the wing.

13. The recliner mechanism of claim 12 wherein the brake further comprises an arcuate band, wherein the arcuate band is axially offset from the panel and extends along an arc between the driver and the dust cover.

14. The recliner mechanism of claim 13 wherein the arcuate band is spaced apart from the driver engagement feature.

15. The recliner mechanism of claim 12 wherein the driver engagement feature extends toward the driver.

16. The recliner mechanism of claim 15 further comprising a wedge that is received in a center hole in the first plate, wherein the brake further comprises an inner arm that engages the driver and is spaced apart from the wedge.

17. The recliner mechanism of claim 16 wherein the inner arm extends from the wing.

18. The recliner mechanism of claim 17 wherein the inner arm is disposed on the wing between the driver engagement feature and the dust cover engagement feature.

19. The recliner mechanism of claim 16 further comprising a spring that has an arm disposed at an end of the spring, wherein the arm extends through a spring arm window in the brake and exerts a biasing force on the wedge.

20. The recliner mechanism of claim 19 wherein the arm is spaced apart from the brake when the dust cover engagement feature is disengaged from the dust cover.

* * * * *